US012759390B2

(12) United States Patent
Kwon et al.

(10) Patent No.: US 12,759,390 B2
(45) Date of Patent: Oct. 13, 2026

(54) DRIVING MODULE FOR VEHICLE AND POWER SUPPLY STRUCTURE

(71) Applicants: HYUNDAI MOTOR COMPANY, Seoul (KR); KIA CORPORATION, Seoul (KR)

(72) Inventors: Hyuk Joon Kwon, Hwaseong-si (KR); Buhm Joo Suh, Hwaseong-si (KR); Seung Wook Lee, Hwaseong-si (KR); Tal Chol Kim, Hwaseong-si (KR); Yeong Il Choi, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 166 days.

(21) Appl. No.: 18/956,382

(22) Filed: Nov. 22, 2024

(65) Prior Publication Data

US 2025/0196615 A1 Jun. 19, 2025

(30) Foreign Application Priority Data

Dec. 13, 2023 (KR) ........................ 10-2023-0180900

(51) Int. Cl.
*B60K 7/00* (2006.01)
*B62D 3/04* (2006.01)

(52) U.S. Cl.
CPC .............. *B60K 7/0007* (2013.01); *B62D 3/04* (2013.01)

(58) Field of Classification Search
CPC .......... B60K 7/0007; B60K 2007/0038; B60K 2007/0092; B60G 2206/50; B60G 2204/182; B60G 2300/50; B60G 3/01; B62D 5/0418; B62D 5/0454; B62D 3/04; B62D 7/023; B60R 16/03; B60T 13/746; B60B 27/0021
See application file for complete search history.

(56) References Cited

U.S. PATENT DOCUMENTS

| | | | | |
|---|---|---|---|---|
| 8,453,774 | B2 * | 6/2013 | Nagaya | B60K 17/30 180/65.6 |
| 10,131,218 | B2 * | 11/2018 | Dolgov | B60K 7/00 |
| 2016/0221432 | A1 * | 8/2016 | Tamura | B60G 3/20 |
| 2019/0248233 | A1 * | 8/2019 | Calleija | B60B 37/10 |
| 2021/0031866 | A1 * | 2/2021 | Park | B62K 19/32 |
| 2021/0394610 | A1 * | 12/2021 | Kim | B60B 27/0021 |
| 2022/0379660 | A1 * | 12/2022 | Choi | B60G 11/14 |
| 2023/0051754 | A1 * | 2/2023 | Chang | B62D 5/001 |
| 2023/0202287 | A1 * | 6/2023 | Park | B60K 7/0007 180/13 |
| 2023/0234396 | A1 * | 7/2023 | Tominaga | B60B 27/0052 |
| 2024/0017579 | A1 * | 1/2024 | Toda | B60G 15/02 |

* cited by examiner

*Primary Examiner* — Lori Wu
(74) *Attorney, Agent, or Firm* — MCDONNELL BOEHNEN HULBERT & BERGHOFF LLP

(57) ABSTRACT

A driving module for vehicle and a power supply structure are configured to include a driving system and a braking system provided with an in-wheel motor and an EMB-based brake inside a rim of a tire, a suspension system in which a suspension support shaft serves as a rotational central axis of the rim, and a steering system provided on an upper portion of the suspension system, in which the steering system includes a first steering member provided between the suspension system and a body, and a second steering member which is positioned at an inner side of the first steering member and of which lower portion is linked with the suspension system.

20 Claims, 6 Drawing Sheets

A-A Cross-section View

B-B Cross-section View

DRIVING MODULE FOR VEHICLE AND POWER SUPPLY STRUCTURE

CROSS-REFERENCE TO RELATED APPLICATION

The present application claims priority to Korean Patent Application No. 10-2023-0180900, filed on Dec. 13, 2023, the entire contents of which is incorporated herein by reference in its entirety for all purposes.

TECHNICAL FIELD

The present disclosure relates to a driving module for vehicle and a power supply structure, and more specifically relates to a driving module for vehicle and a power supply structure configured to include a driving/braking system, a steering system, and a suspension system.

BACKGROUND

Various forms of driving modules have been studied for the purpose of application to future mobility, and a Protean 360+ driving module may be an independent driving module of 1-piece body mount grounding to realize a 90° or higher steering angle.

At this time, the Protean 360+ driving module can realize a 90° or higher contrast steering angle by utilizing a steering motor on an upper side, but may have poor durability due to the 1-piece body mount of the upper portion.

In particular, the Protean 360+ driving module allows omission of body lower connection parts such as a chassis lower arm and a tie rod and control by independently driving and steering each tire in a vehicle, and thus can significantly reduce a turning radius during turning of the vehicle.

In addition, the Protean 360+ driving module is configured to have a ±180° steering angle, and a Mobis e-Corner driving module is configured to have a ±90° steering angle.

In addition, a Schaeffler Corner Module is a driving module configured in the form of 4-piece mount for running stability and configured to include parts such as a chassis lower arm and a tie rod and to have a −90° to +45° steering angle.

In particular, the Schaeffler Corner Module is advantageous in durability and running stability compared to a driving module of 1-piece body mount, but has a limit in a kinematic 90° or lower steering angle due to a body link site.

On the other hand, a wheelbot by Hankook Tire allows omission of parts such as a chassis lower arm and a tie rod, and is configured to have +360° steering angle.

In addition, in the wheelbot by Hankook Tire, an upper portion of a suspension system can be replaced with a special material structure and a three-directional mobility can be realized through the globular shape, but realization of a contrast steering angle can be limited due to wiring.

SUMMARY

For the purpose of solving the above-described problems in the related art, the present disclosure is directed to providing a driving module for vehicle that can reduce a space for installing a steering system and can realize full-flat mobility.

In addition, the present disclosure is directed to providing a power supply structure configured to realize a limitless steering angle by reliably supplying power to a driving/braking system installed in a rim of a tire.

The driving module for vehicle according to the present disclosure includes a driving system comprising an in-wheel motor provided inside a rim of a tire, a braking system comprising a brake braking a rotation of the tire, a suspension system comprising a suspension support shaft extending along a rotational axis of the rim to rotatably support the rim, and a steering system provided on an upper portion of the suspension system, wherein the steering system includes a first steering member provided between the suspension system and a body of a vehicle, and a second steering member which is positioned at an inner side of the first steering member and of which a lower portion is coupled with the suspension system The first steering member may be fixed and attached to a lower portion of the body.

The first steering member may have a disk shape.

An upper portion of the suspension system may be disposed within the first steering member.

The second steering member may be rotated to steer the suspension system.

The second steering member may be in a ring shape.

The steering system may further include a steering driving unit that drives a rotation of the second steering member.

The second steering member and the steering driving unit may be teeth-engaged with each other.

The steering driving unit may comprise a worm, and the second steering member may comprise a worm wheel teeth-engaged with the worm.

The second steering member may be positioned at a height of the tire.

In addition, according to the present disclosure, there is provided a power supply structure of a driving module for a vehicle, which includes a driving system comprising an in-wheel motor provided inside a rim of a tire, a braking system comprising a brake braking a rotation of the tire, a suspension system comprising a suspension support shaft extending along a rotational axis of the rim to rotatably support the rim, and a steering system provided on an upper portion of the suspension system, wherein the steering system includes a first steering member provided between the suspension system and a body of a vehicle, and a second steering member which is positioned at an inner side of the first steering member and of which a lower portion is coupled with the suspension system. The power supply structure may include a power connection unit provided at an inner side surface of the first steering member, a first power supply unit installed at an outer side of the first steering member and electrically connected to the power connection unit, and a second power supply unit provided on a side of the suspension system and electrically connected to each of the driving system, the braking system and the power connection unit.

The power connection unit may be installed on an inner peripheral surface of the first steering member, which is in contact with an outer peripheral surface of the suspension system.

The power connection unit may haven a ring shape.

The first power supply unit may be supplied with power from an exterior power source.

An upper end of the second power supply unit protrudes from an exterior peripheral surface of the suspension system in contact with an inner peripheral surface of the first steering member to be electrically connected to the power connection unit, and a lower end of the second power supply unit is electrically connected to the driving system and the braking system.

The upper end of the second power supply unit may be electrically connected to a ring inner peripheral surface of the power connection unit.

Electrical connection may be maintained while the second power supply unit rotates along the ring inner peripheral surface.

The driving module for vehicle according to the present disclosure may provide substantial and practical effects, for example, reducing a space for installing a steering system compared to an independent driving module of 1-piece body mount and thereby realizing full-flat mobility and improving durability due to multiple piece mount, realizing a limitless steering angle by a power supply structure compared to a multiple piece body mount and allowing omission of body lower connection parts such as a tie rod and a lower arm so as to achieve advantageous packaging and space utilization, and the like.

DETAILED DESCRIPTION

Figure 1:
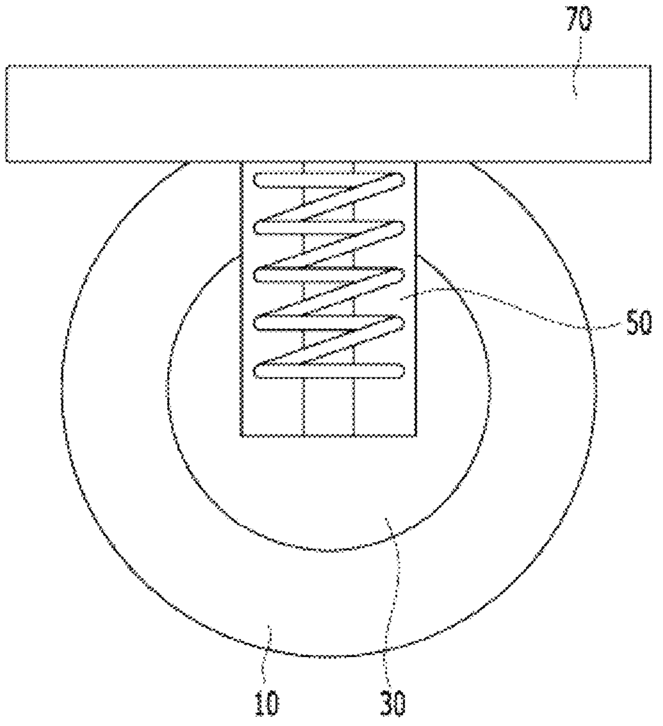
FIG. 1 is a side configuration view to explain a driving module for vehicle according to the present disclosure.

Because the present disclosure may be modified in various ways and may have various embodiments of the present disclosure, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

The suffixes “module” and “unit” used herein are used only for name distinction between elements and should not be construed as being physiochemically divided or separated or assumed that they may be divided or separated.

Terms including ordinals such as “first”, “second”, and the like may be used to describe various elements, but the elements are not limited by the terms. The terms are used only as name meaning for distinguishing one element from another element, and sequential meaning between the elements are understood not from the name but from the context of the description.

The term “and/or” is used to include any combination of a plurality of items to be included. For example, “A and/or B” includes all three cases such as “A”, “B”, and “A and B”.

When it is mentioned that an element is “connected” or “linked” to another element, it should be understood that the element may be directly connected or linked to another element, but another element may exist in between.

The terminology used herein is for describing specific exemplary embodiments only and is not intended to be limiting of the present disclosure. Singular expressions include plural expressions, unless the context clearly indicates otherwise. In the present application, it should be understood that the term “include” or “have” indicates that a feature, a number, a step, an operation, a component, a part, or a combination thereof described in the specification exists, but does not exclude the possibility of existence or addition of one or more other features, numbers, steps, operations, components, parts, or combinations thereof in advance.

Unless otherwise defined, all terms used herein, including technical or scientific terms, include the same meaning as that generally understood by those skilled in the art. It will be understood that terms, such as those defined in commonly used dictionaries, should be interpreted as including a meaning which is consistent with their meaning in the context of the relevant art and will not be interpreted in an idealized or overly formal sense unless so defined herein.

Furthermore, the term “unit”, “control unit”, “control device”, or “controller” is a term widely used for naming a controller that commands a specific function, and does not mean a generic function unit. For example, a control unit by these names may include a communication device that communicates with another controller or sensor to control a corresponding function, a computer-readable recording medium that stores an operating system or a logic command, input/output information, and the like, and one or more processors that perform judgement, calculation, determination, and the like necessary for controlling the corresponding function.

Meanwhile, the processor may include a semiconductor integrated circuit and/or electronic systems that perform at least one or more of comparison, judgement, calculation, and determination to achieve a programmed function. For example, the processor may be one of a computer, a microprocessor, a CPU, an ASIC, and an electronic circuit (circuitry, logic circuits), or a combination thereof.

Furthermore, the computer-readable recording medium (or simply referred to as a memory) includes all types of storage devices in which data which may be read by a computer system is stored. For example, the memory may include at least one type of a flash memory, of a hard disk, of a micro, of a card (for example, a secure digital (SD) card or an Extream digital (XD) card), and the like, and at least one type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium may be electrically connected to the processor, and the processor may retrieve and record data from the recording medium. The recording medium and the processor may be integrated or may be physically separated.

Hereinafter, each configuration will be described in detail in the preferable examples of the present disclosure with reference to the accompanying drawings.

Figure 2:
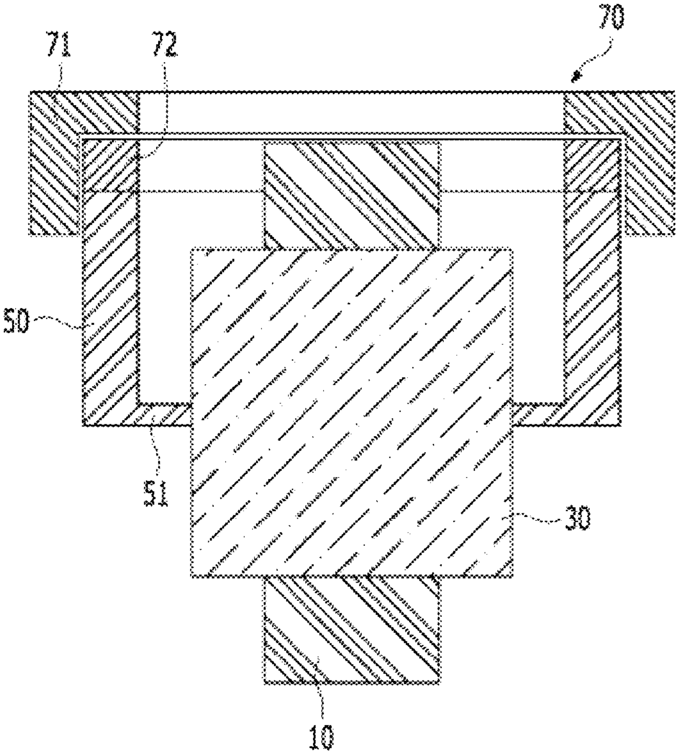
FIG. 2 is a front configuration view to explain the driving module for vehicle according to the present disclosure.

As illustrated in FIGS. 1 and 2, a driving module for vehicle according to an embodiment of the present disclosure can be configured of a driving/braking system (30), a suspension system (50), and a steering system (70).

Figure 3:
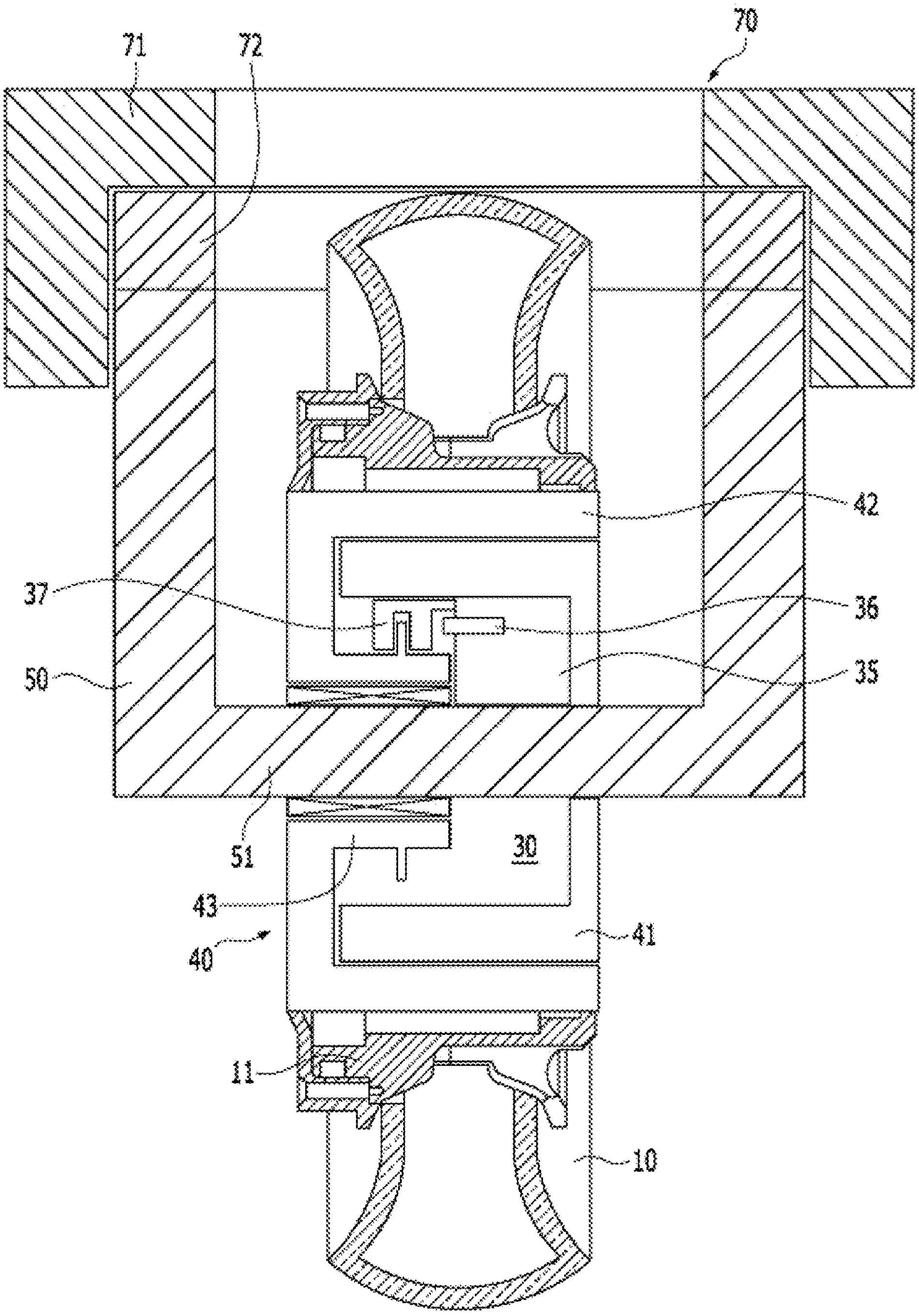
FIG. 3 is a configuration view to exemplify a driving/braking system of the driving module for vehicle according to the present disclosure.

At this time, as illustrated in FIG. 3, the driving/braking system (30) can be configured to be embodied by an in-wheel motor (40) and an electro-mechanical brake (EBM) (35) installed inside a rim (11) of a tire (10).

Here, the rim (11) of the tire (10) is a circular stiff member including a wheel, the rim is combined with the tire surrounding an outer circle thereof, and an inner space of the rim can include a hollow portion having a predetermined size that can include the in-wheel motor (40) and the electro-mechanical brake (35).

In addition, the suspension system (50) can be positioned on left and right sides of the driving/braking system (30), can be fixedly installed such that the suspension support shaft (51) forms a rotational central axis, and can be configured to use spring/damper elements.

Figure 4:
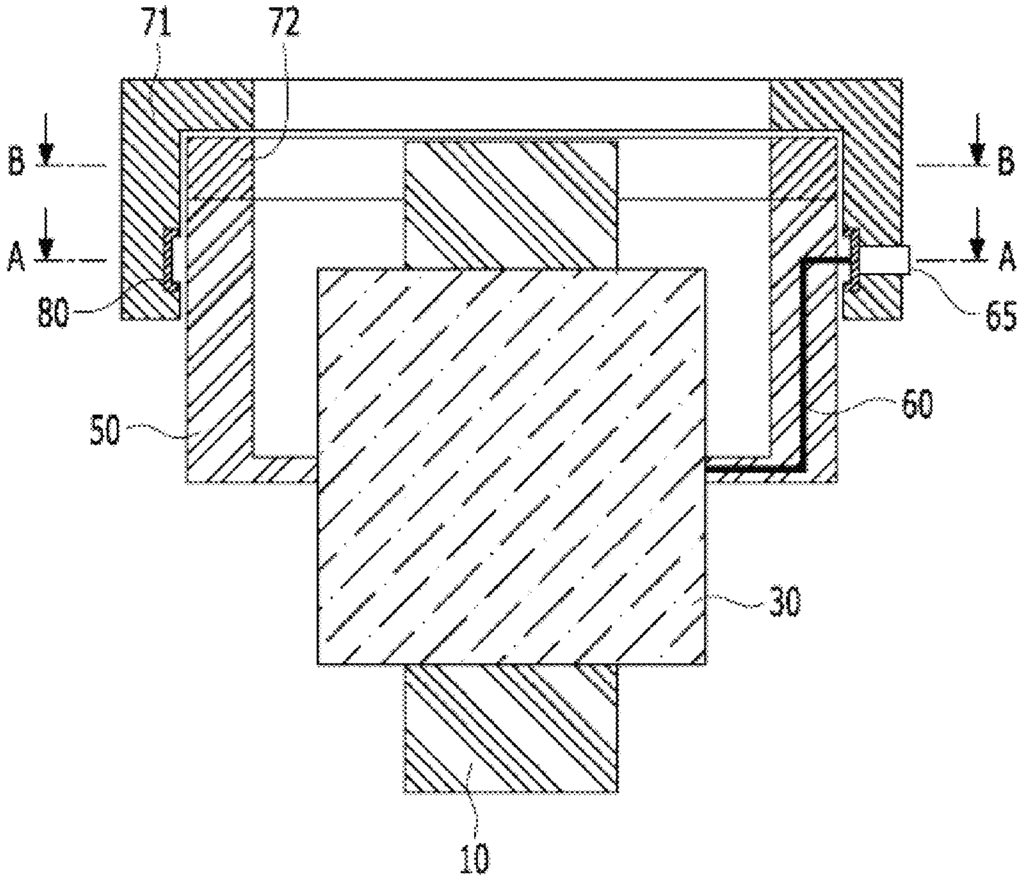
FIG. 4 is a configuration view to explain a steering system and a power supply structure of the driving module for vehicle according to the present disclosure.
Figure 5:
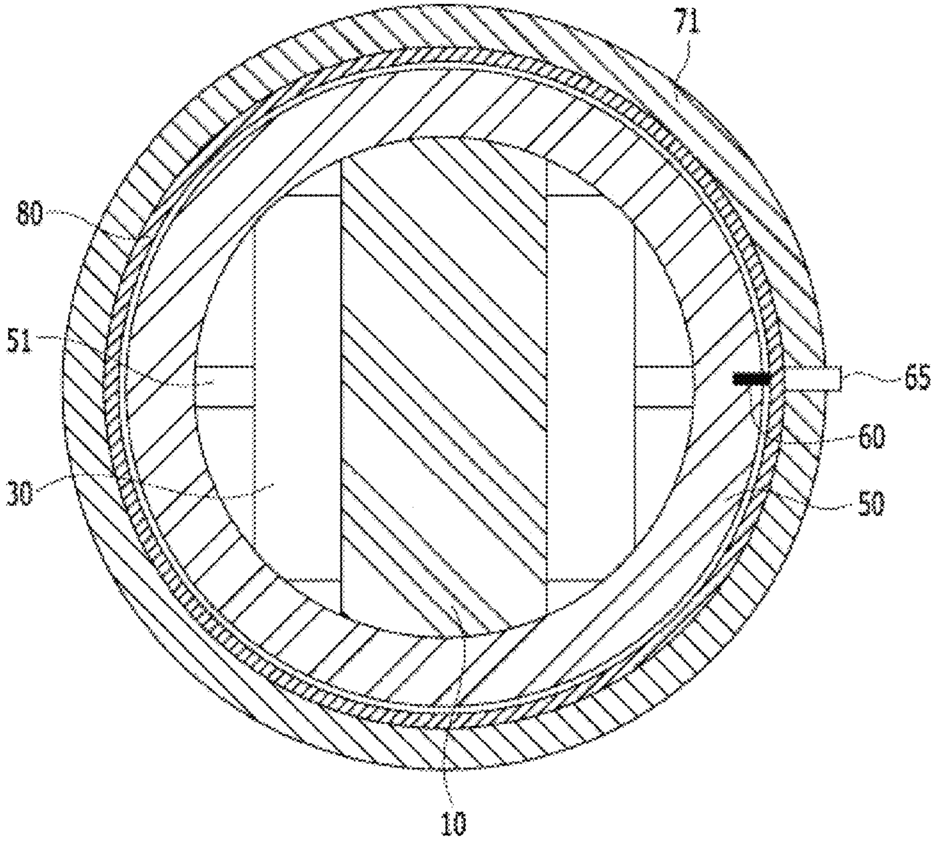
FIG. 5 is a cross-sectional view of A-A of FIG. 4.
Figure 6:
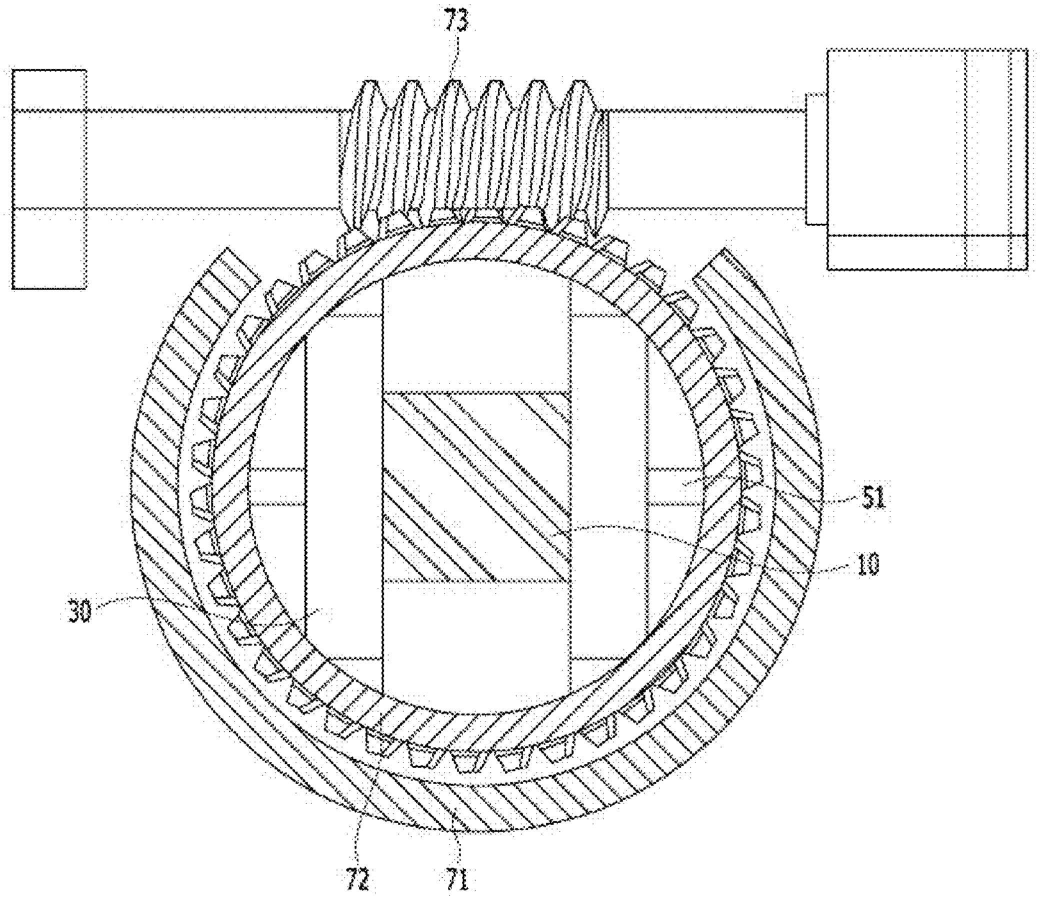
FIG. 6 is a cross-sectional view of B-B of FIG. 4.

In addition, as illustrated in FIGS. 4 to 6, the steering system (70) is configured to include a first member 71 in a disk shape positioned above the suspension system (50) and attached on a lower portion of the body, a second steering member (72) which is positioned at an inner side of the first steering member and of which lower portion is attached with an upper portion of the suspension system (50), and a steering driving unit (73) driving rotation of the second steering member (72), and thus a packaging space formed above the tire (10) is minimized to realize full-flat mobility.

The driving/braking system (30), the suspension system (50), and the steering system (70) included in the driving module for vehicle according to an embodiment of the present disclosure will be described in detail.

Driving/Braking System

As illustrated in FIG. 3, the driving/braking system (30) can be configured to be operated by using the in-wheel motor (40) and the EMB-disk brake (35).

At this time, the in-wheel motor (40) is a motor that is installed in an inner space of the rim (11) of the tire (10) to directly transmit power, and an inner rotor or outer rotor motor can be used as the motor.

In particular, as illustrated in FIG. 3, the in-wheel motor (40) of the driving/braking system (30) is configured such that when power is applied to a stator (41) including stator windings (not illustrated) formed of a conductive material, a rotor (42) which is a permanent magnet rotates the disk (43) while rotating the rim (11).

In particular, the suspension support shaft (51) of the suspension system (50) is configured to form a rotational central axis, and the rotor (42) can be applied to rotate the rim (11) and the disk (43) around the suspension support shaft.

In addition, the driving/braking system (30) can use the EMB-based brake (35) in which a brake pad (37) driven by an actuator (36) electrically controls the rotating disk (43), and the electro-mechanical brake (EMB) can be configured to electrically control operation of the brake.

At this time, the EMB-based brake (35) according to the present disclosure is a brake transformed into a mechanical type that does not need a hydraulic line of a hydraulic brake, and can be configured to remove a hydraulic line limiting a steering angle.

In addition, the electro-mechanical brake allows more precise control of braking power compared to the hydraulic brake and can be automatically operated as an autonomous driving is applied, thereby enhancing a user's convenience and realizing upgrade in quality of a vehicle.

In particular, in the present disclosure, a braking system using an EMB-based disk or drum can be applied, and in the electro-mechanical drum brake, rotational torques are further generated due to a self-servo action in which a brake shoe pressed by the drum tends to rotate with the drum, and thus the torque braking power can be increased.

Suspension System

As illustrated in FIGS. 2 to 4, the suspension system (50) can be positioned on left and right sides of the tire (10), can be configured to support the body using spring or damper elements, and can be applied such that the suspension support shaft (51) forms a rotational central axis of the tire (10).

In particular, the suspension system (50) can be configured such that an upper portion thereof is combined with the second steering member (72) of the steering system (70) and forms a multiple piece body mounting to realize improvement of durability.

Steering System

As illustrated in FIG. 4, the steering system (70) can include the first steering member (71) and the second steering member (72), and the first steering member (71) that can be in a substantially disk shape can be fixed by being linked with the lower portion of the body and the second steering member (72) that can be in a ring shape can be configured to be embedded in the first steering member (71) and be combined with the upper portion of the suspension system (50).

In particular, the steering system (70) has a structure in which the first steering member (70) that can be in a substantially disk shape and the second steering member (72) that can be in a ring shape are stacked up and down, and can minimize the packaging space formed between the tire (10) and the lower portion of the body, thereby realizing full-flat mobility and achieving improvement of durability due to multiple piece mount.

Taking a detailed view, as illustrated in FIG. 6, the steering system (70) can include the first steering member (71) in a disk shape, which is positioned on the upper portion of the suspension system (50) and attached on the lower portion of the body, the second steering member (72), which is positioned at the inner side of the first steering member and of which lower portion is attached with the upper portion of the suspension system (50), and the steering driving unit (73) driving rotation of the second steering member (72).

At this time, the second steering member (72) and the steering driving unit (73) can be applied with a gear structure in which the second steering member (72) and the steering driving unit (73) are teeth engaged with each other, and when the steering driving unit is a worm, the second steering member is a worm wheel, and the steering driving unit can be configured to be rotated by a driving motor.

Therefore, when the steering driving unit (73) is driven, the second steering member (72) rotates and the suspension system (50) is rotated to a steering angle to change a traveling direction of the tire (10).

Power Supply Structure

The driving module for vehicle can include the driving/braking system (30) that can be installed inside the rim (11) of the tire (10), and the steering angle of the tire controlled by the steering system (70) can be limited by a power supply structure that supplies power to the driving/braking system (30).

As illustrated in FIG. 4, the power supply structure of the driving module for vehicle can be configured such that a ring type power connection unit (80) is fixedly provided on an inner peripheral surface of the first steering member (71), and a first power supply unit (65) is provided on a side of the first steering member (71).

At this time, the power connection unit (80) can be applied such that the first supply unit is electrically connected to a side of the ring-shaped outer peripheral surface, and the first power supply unit can be configured to be supplied with an exterior power source.

In addition, a second power supply unit (60) is embedded on a side of the suspension system (50), and the second power supply unit (60) can be configured such that an upper end thereof is electrically connected along a ring inner peripheral surface of the power connection unit (80).

In addition, the second power supply unit (60) can be configured such that a lower end thereof is electrically connected to the in-wheel motor (40), the EMB-based disk brake (35), and the like.

Taking a view, the power supply structure of the driving module for vehicle is configured such that when the suspension system (50) rotates to a steering angle with the second steering member (72) of the steering system (70), the second power supply unit (60) rotates along the ring inner peripheral surface of the power connection unit (80) in a state in which the upper end thereof is electrically connected to the ring inner peripheral surface of the power connection unit (80) in a fixed state so as to supply power to the in-wheel motor (40), the EMB-based disk brake (35), and the like.

Eventually, the power supply structure of the driving module for vehicle can include the second power supply unit (60), the first power supply unit (65), and the power connection unit (80), and can be configured not to be limited by a power supply wire during operation of a steering angle of the tire (10) by the steering system (70) so as to realize a limitless steering angle.

The foregoing descriptions of preferable exemplary embodiments according to the present disclosure have been presented. It is obvious for those skilled in the art that, in addition to the embodiments described above, the present disclosure can be specified in other specific forms without departing from the gist or scope of the present disclosure. Therefore, the above-described embodiments should be considered not to be limited but exemplary, and thus the present disclosure is not limited to the above-described explanation and can be modified within the scope of the attached claims and the equivalent range.

What is claimed is:

1. A driving module for vehicle comprising:

a driving system comprising an in-wheel motor positioned inside a rim of a tire;

a braking system comprising a brake configured to brake a rotation of the tire;

a suspension system comprising a suspension support shaft extending along a rotational axis of the rim and configured to rotatably support the rim; and a steering system positioned on an upper portion of the suspension system;

wherein the steering system includes a first steering member positioned between the suspension system and a body of a vehicle, and a second steering member positioned at an inner side of the first steering member, and having a lower portion coupled with the suspension system.

2. The driving module for vehicle according to claim 1, wherein the first steering member is fixed and attached to a lower portion of the body of the vehicle.

3. The driving module for vehicle according to claim 1, wherein the first steering member has a disk shape.

4. The driving module for vehicle according to claim 1, wherein an upper portion of the suspension system is disposed within the first steering member.

5. The driving module for vehicle according to claim 3, wherein an upper portion of the suspension system is disposed within the first steering member.

6. The driving module for vehicle according to claim 1, wherein the second steering member is configured to be rotated to steer the suspension system.

7. The driving module for vehicle according to claim 1, wherein the second steering member has a ring shape.

8. The driving module for vehicle according to claim 1, wherein the steering system further includes a steering driving unit configured to drive a rotation of the second steering member.

9. The driving module for vehicle according to claim 7, wherein the second steering member and the steering driving unit are teeth-engaged with each other.

10. The driving module for vehicle according to claim 8, wherein the steering driving unit comprises a worm, and the second steering member comprises a worm wheel teeth-engaged with the worm.

11. The driving module for vehicle according to claim 1, wherein the second steering member is positioned at a height of the tire.

12. A power supply structure of a driving module for vehicle, wherein the driving module includes a driving system comprising an in-wheel motor positioned inside a rim of a tire, a braking system comprising a brake for braking a rotation of the tire, a suspension system comprising a suspension support shaft extending along a rotational axis of the rim to rotatably support the rim, and a steering system provided on an upper portion of the suspension system, wherein the steering system includes a first steering member positioned between the suspension system and a body of a vehicle, and a second steering member positioned at an inner side of the first steering member and of which a lower portion is coupled with the suspension system, the power supply structure comprising:

a power connection unit positioned at an inner side surface of the first steering member;

a first power supply unit positioned at an outer side of the first steering member and electrically connected to the power connection unit; and a second power supply unit positioned on a side of the suspension system and electrically connected to each of the driving system, the braking system, and the power connection unit.

13. The power supply structure of claim 12, wherein the power connection unit is positioned on an inner peripheral surface of the first steering member, which is in contact with an outer peripheral surface of the suspension system.

14. The power supply structure of claim 13, wherein an upper end of the second power supply unit protrudes from the outer peripheral surface of the suspension system in contact with the inner peripheral surface of the first steering member to be electrically connected to the power connection unit, and a lower end of the second power supply unit is electrically connected to the driving system and the braking system.

15. The power supply structure of claim 12, wherein the power connection unit has a ring shape.

16. The power supply structure of claim 12, wherein the first power supply unit is supplied with power from an exterior power source.

17. The power supply structure of claim 12, wherein an upper end of the second power supply unit protrudes from the outer peripheral surface of the suspension system in contact with an inner peripheral surface of the first steering member to be electrically connected to the power connection unit, and a lower end of the second power supply unit is electrically connected to the driving system and the braking system.

18. The power supply structure of claim 17, wherein the upper end of the second power supply unit is electrically connected to a ring inner peripheral surface of the power connection unit.

19. The power supply structure of claim 12, wherein an upper end of the second power supply unit is electrically connected to a ring inner peripheral surface of the power connection unit.

20. The power supply structure of claim 19, wherein electrical connection is maintained while the second power supply unit rotates along the ring inner peripheral surface.

* * * * *